United States Patent
Kurtz et al.

(10) Patent No.: US 8,276,466 B2
(45) Date of Patent: Oct. 2, 2012

(54) TWO OR THREE-AXIS SHEAR LOAD CELL

(75) Inventors: Anthony D. Kurtz, Saddle River, NJ (US); Nora Kurtz, legal representative, Saddle River, NJ (US); Joseph VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 220 days.

(21) Appl. No.: 12/751,505

(22) Filed: Mar. 31, 2010

(65) Prior Publication Data
US 2011/0239783 A1 Oct. 6, 2011

(51) Int. Cl.
*G01D 7/00* (2006.01)
*G01L 1/22* (2006.01)

(52) U.S. Cl. .................................. 73/862.041
(58) Field of Classification Search .................. 73/862.041–862.046
See application file for complete search history.

(56) References Cited

U.S. PATENT DOCUMENTS

| | | | | |
|---|---|---|---|---|
| 3,729,990 A * | 5/1973 | Oliver | ...................... | 73/862.05 |
| 4,459,863 A * | 7/1984 | Nordstrom | ............... | 73/862.634 |
| 4,600,067 A * | 7/1986 | Artigue et al. | ................ | 177/211 |
| 4,628,745 A * | 12/1986 | Hatamura | ................. | 73/862.042 |
| 4,899,599 A * | 2/1990 | Eddens | ..................... | 73/862.382 |
| 5,161,594 A * | 11/1992 | Bolton et al. | ................... | 164/4.1 |
| 5,604,336 A * | 2/1997 | Johnson | ......................... | 177/229 |
| 6,871,552 B2 * | 3/2005 | Liu et al. | ................... | 73/862.041 |
| 7,051,600 B1 * | 5/2006 | Cavallaro et al. | ......... | 73/862.041 |
| 7,204,160 B1 * | 4/2007 | Sadegh et al. | ............. | 73/862.041 |
| 7,788,984 B2 * | 9/2010 | Meyer et al. | ............. | 73/862.041 |

* cited by examiner

*Primary Examiner* — Max Noori
(74) *Attorney, Agent, or Firm* — Troutman Sanders LLP; James E. Schutz; Jihan A. R. Jenkins

(57) ABSTRACT

A two or three axis load cell capable of measuring axial and one or more shear forces is disclosed. The load cell can comprise a force collector connected by one or more connecting rods to one or more cross pieces. The load cell can comprise a single cross piece and can measure an axial force applied to the load cell and at least one component of shear force applied to the load cell. In other embodiments, the load cell can comprise two cross pieces, disposed at disparate angles, to enable the measurement of an axial force and both components of shear force applied to the force collector. The cross pieces are equipped with a means, such as piezoresistive elements to measure their deflection due to the applied forces on the force collector. The connecting rods can be fitted with additional piezoresistors to measure the axial forces on the force collector.

22 Claims, 15 Drawing Sheets

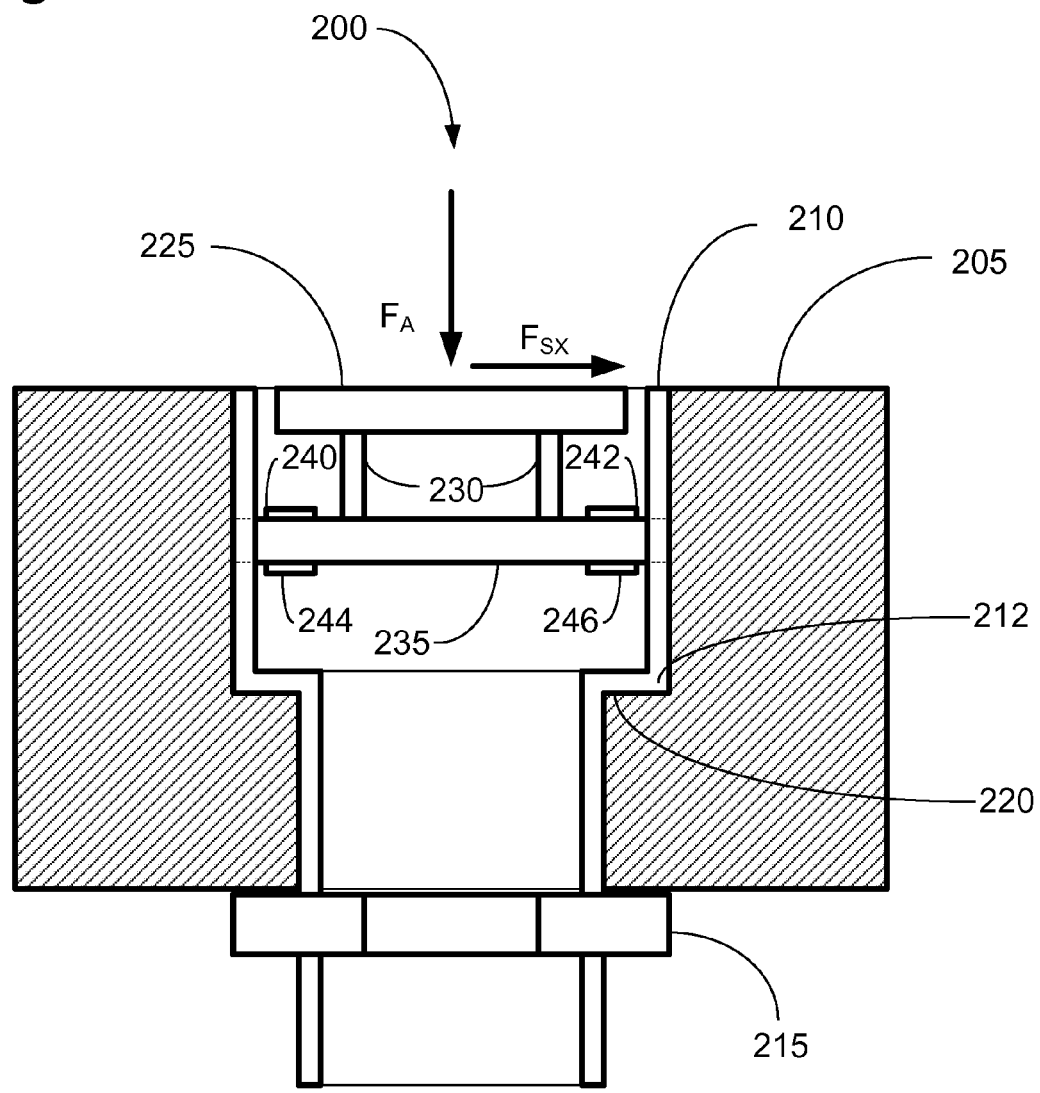

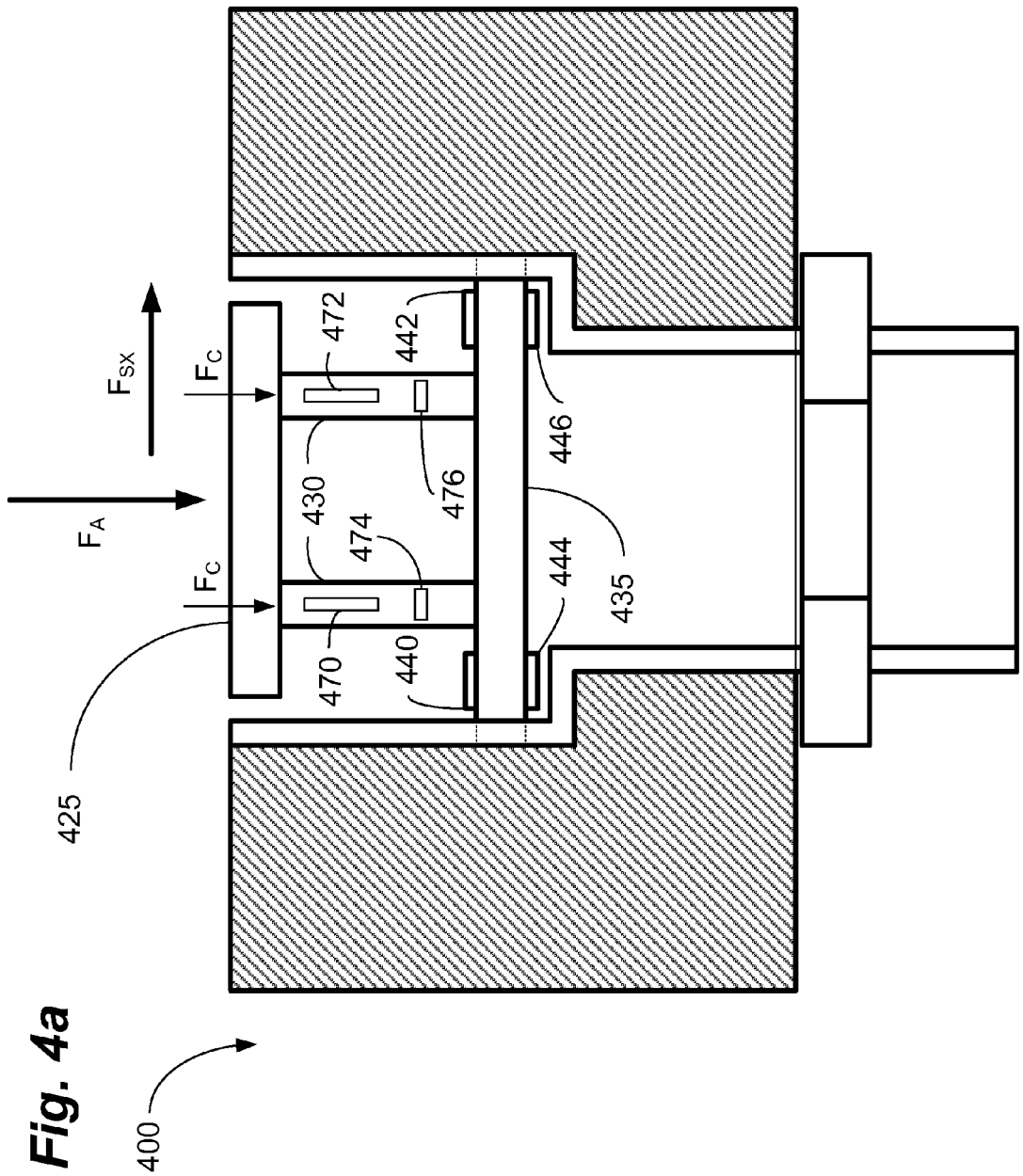

TWO OR THREE-AXIS SHEAR LOAD CELL

TECHNICAL FIELD

Embodiments of the present invention relate generally to load cells, and more specifically to a two or three-axis load cell capable of measuring both axial and sheer forces.

BACKGROUND

A load cell is a device used to provide measurement of an applied force. In general, a load cell is subjected to the applied force and then converts the force into a measurement. This conversion can be achieved, for example, mechanically, hydraulically, or electronically. The type of load cell suitable for a particular application is dependent upon, among other things, the magnitude of the force to be measured, the rate of application of the force, and the environment in which the load cell will be used.

An electronic load cell, for example, converts a force into an electrical signal proportional to the force. This is usually done with a mechanical arrangement that deforms in response to the applied force. The mechanical arrangement is fitted with one or more strain gauges to convert the applied force into an electrical signal. This can be done, for example, with a piezoresistive element, the resistance of which changes in response to an applied force. The applied force can be measured by passing a reference voltage through the piezoresistor and measuring the change in voltage due to the applied force. The applied force can be calculated from the change in the reference voltage using an appropriate algorithm.

In other applications, it may be desirable to use a hydraulic load cell. A hydraulic load cell uses a chamber filled with hydraulic fluid attached to a hydraulic pressure gauge. When the load cell is subjected to an applied force, the chamber exerts a force on the hydraulic fluid producing a reading on the hydraulic pressure gauge. This hydraulic pressure can be converted into a force based on the area of the chamber. Hydraulic load cells can be useful for outdoor applications because they are not affected by spurious voltages, such as lightning. This can be useful in applications such as over-the-road truck scales.

Conventionally, load cells have generally been used to measure only axial forces, i.e., forces that act parallel to the central axis of the load cell. The aforementioned truck scales, for example, are used to measure the weight of a truck (or a downward force) as it passes over vertically oriented scales. Load cells are commonly used to measure the thrust provided by a jet or rocket engine. Engine test stands are intentionally designed hold the engine substantially in line with the load (and to measure only axial forces) to preclude the need to contain any side forces produced by engine misalignment.

In some applications, however, it can be desirable to measure both normal and shear forces exerted on a load cell. In the development of tires for both racing and consumer applications, for example, it is desirable to measure the traction provided by the tire. The traction provided by a tire is the amount of shear force the tire can generate against a road or other surface before it breaks free, and spins or slides. Tires generate longitudinal shear forces, for example, when a vehicle is accelerating or decelerating in a straight line. Tires generate lateral shear forces, on the other hand, when the vehicle is turning.

Tires are often tested, for example, on a skid pad, which is a circle of known radius painted on a testing surface such as asphalt. A test driver drives a car fitted with a particular tire around the circle while increasing his speed. Up to the point the car breaks loose, the centripetal force being generated by the speeding car is being offset by an equal and opposite shear force generated by the tires against the asphalt. The maximum such shear force occurs just before the tires break loose. The speed of the test vehicle at this point can be used to calculate the road holding ability of the tires (on that car), which is usually calculated in g-forces. Similar tests can be performed by braking and accelerating the car at the limits of traction. All of this information can be used to develop new rubber compounds that, for example, provide increased traction, increased tread life, or a combination of the two.

This type of testing, however, does not accurately account for the fact that the traction of a tire increases as the normal force with which the tire is forced into contact with the surface increases. In other words, a tire mounted on a heavier car will be less likely to spin at the same level of power. It can be desirable, therefore, to plot the shear force being generated by the tire against the normal (or axial) load that is applied to the tire or to remove the axial load from the data altogether. This provides researchers with a substantially objective measure of traction for a particular tire compound with the axial load removed.

This can be useful to compare the outright traction afforded by different compounds and/or tire constructions. This normalized data can also reveal tire compounds and/or constructions that may, for example, be suited for lighter cars, but not heavier ones and vice-versa. Tires can also be tested in a variety of applications designed to simulate real world driving to arrive at a tread compound and/or tread design that performs as desired for a particular job or set of jobs.

As shown in FIG. 1, one example of such an application is measuring the traction of a tire 105 against a surface 110 in a single direction. The surface 110 could be, for example and not limitation, the drum of a dynamometer 110, the surface of a rolling road, or a track surface. The maximum traction of the tire 105 against the roller 110 is measured as the maximum shear force $F_S$ the tire can generate. The shear force $F_S$, while affected by other factors such as temperature, is primarily dependent upon two basic parameters: (1) the coefficient of friction between the tire and the drum and (2) the axial force $F_A$ applied to the tire. The maximum frictional force $F_S$ that can theoretically[1] be applied by the tire 105 to the drum 110 is given by the formula:

$$F_S = \mu_S F_N$$

Where $\mu_S$ is the static coefficient of friction between the tire 105 and the drum 110 and $F_n$ is the normal force, which in this case is equal to the axial force $F_A$. Any rotational force applied to the tire (e.g., by an engine through a transaxle) that is below this threshold can be applied by the tire 105 to the drum 110 without slippage. Any rotational force applied to the tire 105 that exceeds this frictional force $F_S$ will begin to spin the tire 105 on the drum 110 resulting in a loss of traction. This loss of traction is due to the fact that the frictional force of the tire once it begins to spin is dictated by the kinetic coefficient of friction $\mu_K$, which is smaller than $\mu_S$ for most materials.

[1] The actual force that can be applied by the tire, while linear, is slightly lower than the theoretical amount due to tire heating, deformation, and other factors.

Increasing or decreasing the coefficient of friction between surfaces is an important component in product design. For example, in automotive applications, increasing the traction between the tires of a car and the road surface results in, among other things, improved handling, acceleration, and safety. On the other hand, decreasing friction between bearing surfaces, for example, can improve fuel economy and decrease wear. As discussed above, however, because frictional force $F_S$ is based in part on the force normal to the surface, or $F_A$ in this case, accurate measurement of frictional forces requires measurement of both axial forces and shear forces. What is needed is a compact, inexpensive load cell capable of measuring multiple forces at the same time. It is to this end that embodiments of the present invention are primarily directed.

SUMMARY

Embodiments of the present invention comprise a load cell for measuring one or more forces applied to the load cell. The load cell can comprise a force collection plate, or force collector, that is substantially rigidly coupled to a first cross piece with one or more connecting rods. The first cross piece can be disposed inside the body of the load cell substantially perpendicular to the central axis of the load cell. The first cross piece can be fixed on either end such that it is substantially parallel to the force collector. The first cross piece can be fitted with one or more piezoresistors to measure the deflection of the first cross piece in response to the applied forces.

In some embodiments, the piezoresistors can be coupled to form a first Wheatstone bridge such that it outputs a signal proportional to the axial component of the applied forces, i.e., the force that is normal to the force collector and the first cross piece and parallel to the central axis of the load cell. In other embodiments, the piezoresistors can be differently coupled to form a second Wheatstone bridge that outputs a signal proportional to the component of the applied forces acting parallel to the first cross piece, i.e., a component of the total shear force.

In some cases, the shear force may be acting in a direction that is not parallel to the first cross piece. In some embodiments, therefore, the load cell can further comprise a second cross piece. The first cross piece and the second cross piece can be disposed inside the body of the load cell substantially perpendicular to the central axis of the load cell. The first and second cross pieces can be disposed parallel to the force collector and fixed on either end. The first and second cross pieces can be disposed at an angle to enable the measurement of both the axial force and multiple components of a force parallel to the force collector, or the total shear force. In a preferred embodiment, the first and second cross pieces can be disposed perpendicular to one another to simplify the derivation of shear forces.

The first and second cross pieces can each be fitted with piezoresistors to measure their deflection in response to the applied forces, i.e., the normal force and the components of the shear force. In some embodiments, the piezoresistors on the first and second cross pieces can be coupled to form a first and second Wheatstone bridge, each outputting a signal proportional to the component of the applied forces that is normal to the respective cross piece. The signals from the first and second Wheatstone bridges can be combined to derive the total axial force applied to the force collector. In other embodiments, the piezoresistors on each cross piece can be coupled to form a third and fourth Wheatstone bridge that each output a signal proportional to the component of the applied forces acting parallel to the cross pieces, i.e., components of the shear force. In this configuration, the total shear force can be measured regardless of its direction relative to the cross pieces.

In either configuration, i.e., with one cross piece or two cross pieces, the various Wheatstone bridges can be configured by switching between the various piezoresistors as necessary. When using a switch as described, however, normal forces and shear forces cannot be measured simultaneously. The signals, nonetheless, can be switched at a rate sufficient to render the delay insignificant. In an alternative embodiment, each cross piece can be fitted with a first set of piezoresistors for measuring normal forces and a second set of piezoresistors for measuring shear forces. In this configuration, normal forces and shear forces can be measured simultaneously.

In some embodiments, additional piezoresistors can be mounted on the connecting rods. In this configuration, the axial force can be measured using a Poisson bridge. In other words, one set of piezoresistors can be mounted longitudinally on the connecting rods to measure their compression due to an axial force applied to the force collector. A second set of piezoresistors can be mounted laterally on the connecting rods to measure the Poisson expansion of the beam due to the axial force. The two sets of piezoresistors can be combined to form a Poisson bridge that outputs a signal proportional to the axial force on the force collector. This can enable the piezoresistors mounted on the cross pieces to measure only shear forces. In this manner, the shear forces and axial force on the force collector can be measured simultaneously. In some embodiments, the connecting rods can be extended to facilitate mounting the piezoresistors.

Embodiments of the present invention can also comprise a method for creating a force profile across a surface. In this embodiment, the surface can be fitted with multiple load cells. The load cells can be connected to a data collection tool, such as, for example and not limitation, a personal computer. Data, including the normal force and shear forces measured by the load cells, can be collected and plotted using the computer. This can enable researchers to plot, for example, the normal force against the shear force, or components of the shear force.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 2a depicts a cross-sectional view of a load cell with a single cross piece, in accordance with some embodiments of the present invention.

FIG. 4a depicts a cross-sectional view of a load cell with extended connecting rods, in accordance with some embodiments of the present invention.

DETAILED DESCRIPTION

Generally, the device according to the present invention can include a load cell capable of measuring both axial and shear forces. The load cell can comprise a force collector connected by one or more connecting rods to one or more cross pieces. In some embodiments, the load cell can comprise a single cross piece and can measure a normal, or axial, force applied to the load cell and at least one component of the shear force applied to the load cell. In other embodiments, the load cell can comprise two cross pieces, disposed at disparate angles, to enable the measurement of an axial force and both components of shear force applied to the force collector.

The cross pieces are equipped with a means to measure their deflection due to the applied forces on the force collector. They may be equipped with, for example and not limitation, piezoresistive elements or piezoelectric elements. For ease of explanation, embodiments of the present invention will be described below with reference to piezoresistive elements, or "piezoresistors." The use of other suitable means, such as piezoelectric elements is nonetheless expressly contemplated.

Figure 1:
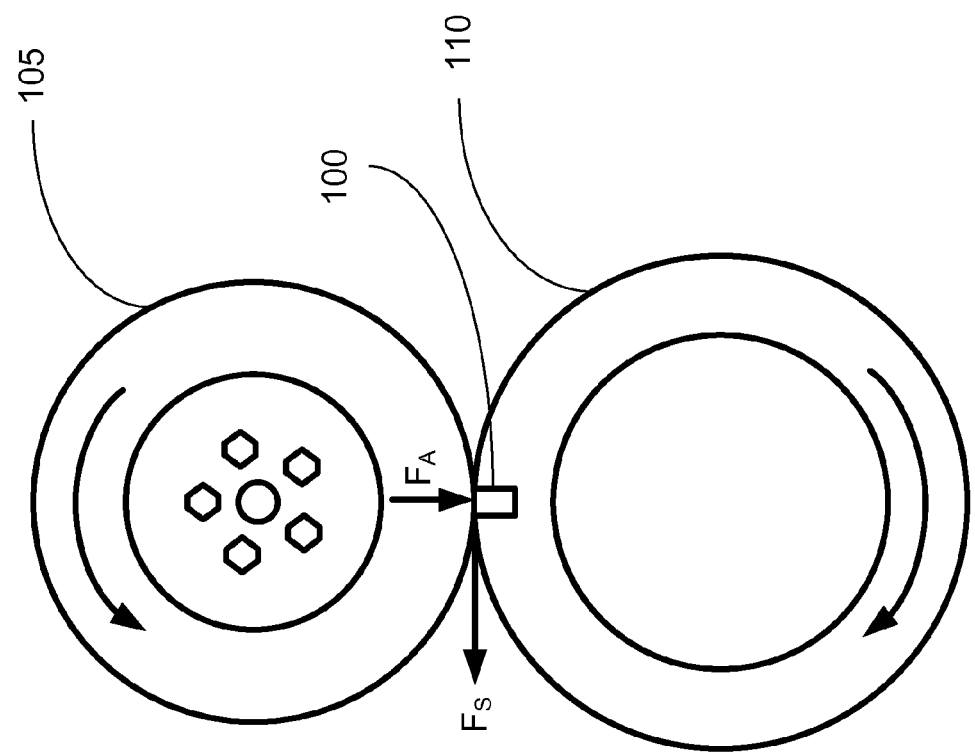
FIG. 1 depicts side view of a tire on a dynamometer roller fitted with a load cell, in accordance with some embodiments of the present invention.

As shown in FIG. 1, embodiments of present invention can comprise a compact load cell 100 that can be installed in a variety of surfaces and can measure one or more applied forces. In some embodiments, one or more load cells 100 can be installed in a surface 110 to provide multiple data points across and/or around the surface 110. The surface of a dynamometer roller 110, for example, can be fitted with multiple load cells 100 to measure forces applied to the roller 110 by a tire 105. Increasing the number of load cells 100 can increase the resolution of the data and increase accuracy. This can facilitate, for example and not limitation, tire construction and compound development by enabling researchers to plot shear forces against axial forces. In fact, this information can useful any time shear forces in relation to axial forces are to be minimized (e.g., in designing bearings) or maximized (e.g., in design braking systems).

FIG. 2a illustrates a cross sectional view of a load cell 200 installed flush with a surface 205. The surface 205 could be any surface on which the applied and/or resultant forces are to be measured. The surface 205 could be, for example and not limitation, the surface of a roller 110 on a dynamometer, the surface of a rolling road, or a track or road surface. In other embodiments, the surface could be, for example and not limitation, the race of a bearing, a brake rotor, or a rotating shaft.

The load cell 200 can comprise a load cell body 210. In some embodiments, the load cell body 210 can have a shoulder 212 and a lock nut 215. This can enable the load cell 200 be installed in a stepped hole 220 in the surface 205. In some embodiments, the stepped hole 220 can be cast or manufactured into the surface 205. In other embodiments, the stepped hole 220 can be created in an existing surface 205, for example, using a countersinking drill bit.

The stepped body 210 of the load cell 200 can be installed in the corresponding stepped hole 220 in the surface 205 and can be retained using the lock nut 215. The lock nut 215 can apply a clamping force to the load cell 200 to retain the shoulder 212 against the mounting hole 220. In other embodiments, other retention methods can be used to retain the load cell 200 in the hole 220. In some embodiments, the load cell 200 can be press fit into the hole 220. In other embodiments, the load cell 200 can be staked into the hole or can be retained, for example and not limitation, using a circlip, cotter pin, glue, epoxy, caulk, weld, or solder.

In some embodiments, the load cell 200 can further comprise a force collector 225. The force collector 225 can be a surface or plate disposed such that it is substantially even with, or slightly above, the mounting surface 205. The force collector 225 can be subjected to the forces $F_A$ and $F_S$, (collectively, the "applied forces") and can transmit the applied forces through one or more connecting rods 230 to a first cross piece 235. In some embodiments, the force collector 225 can comprise the same material as the mounting surface 205 or can have the same coating as the mounting surface 205 to maintain a consistent coefficient of friction across the mounting surface 205.

The force collector 225 can be coupled to the first cross piece 235 using one or more connecting rods 230. The connecting rods 230 can provide a substantially rigid mechanical connection between the force collector 225 and the first cross piece 235. In a preferred embodiment, the force collector 225 and the first cross piece 235 can be substantially parallel to ease derivation of the applied forces. In other embodiments, such as on a banked test surface, for example, it may be desirable to dispose the force collector 225 at an angle to the first cross piece 235. The forces induced by this configuration can be removed using a suitable algorithm.

In some embodiments, the force collector 225, cross piece 235, and connecting rods 230 can be cast or machined from a single piece of material (e.g., CNC machined from billet). In other embodiments, the force collector 225, cross piece 235, and connecting rods 230 can be, for example and not limitation, bolted, riveted, welded, soldered, or adhered together.

In some embodiments, the first cross piece 235 can be disposed inside the load cell body 210 substantially perpendicular to the central axis thereof. The first cross piece 235 can be fitted with one or more piezoresistors 240, 242, 244, 246. The piezoresistors 240, 242, 244, 246 can measure the deflection of the first cross piece 235 caused by the applied forces. In other words, the applied forces act on the force collector 225, the applied forces are transmitted by the connecting rods 230 to the first cross piece 235, and the deflection of the cross piece caused by the applied forces can be measured by the piezoresistors 240, 242, 244, 246.

Figure 2B:
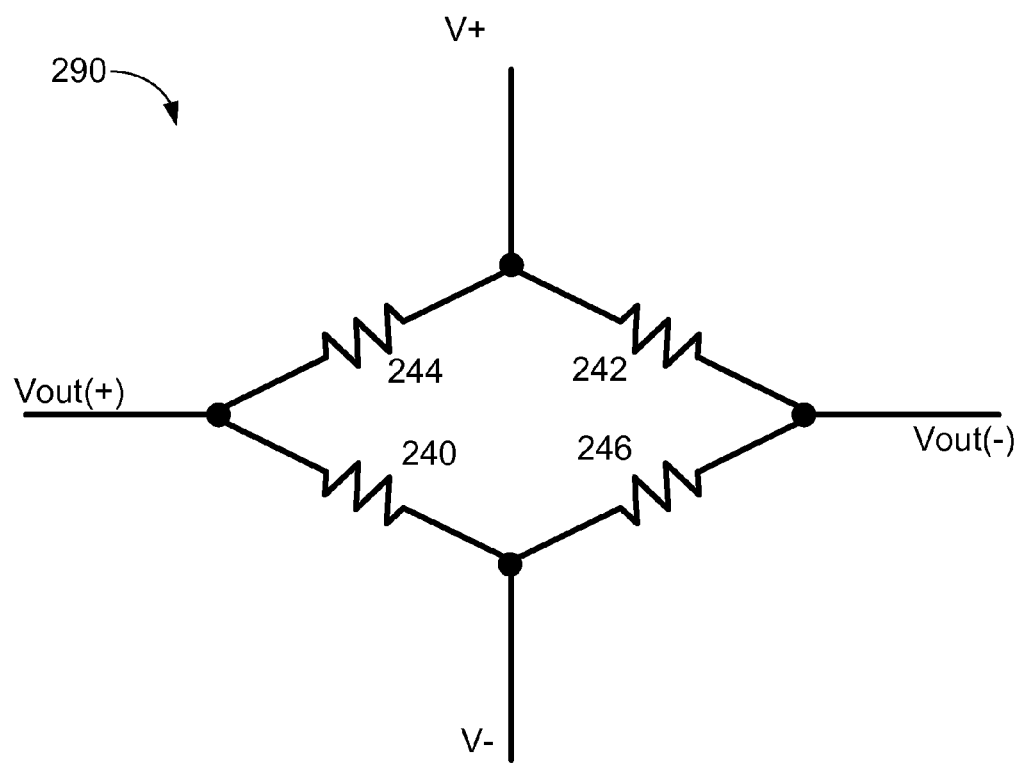
FIG. 2b depicts a schematic of a Wheatstone bridge for measuring an axial force acting on the first cross piece of the load cell, in accordance with some embodiments of the present invention.

In this configuration the load cell can measure both the axial force $F_A$ normal to the force collector 225 and parallel to the central axis of the load cell body 210 and the shear force $F_S$ on the force collector 225. For example, when the axial force $F_A$ is applied to the first cross piece 235, the first cross piece 235 deflects downward. This places piezoresistors 240, 242 in tension and piezoresistors 244, 246 in compression. Connecting the piezoresistors 240, 242, 244, 246 in a first Wheatstone bridge 290, as shown in FIG. 2b, produces a signal proportional to the axial force $F_A$.

Figure 2C:
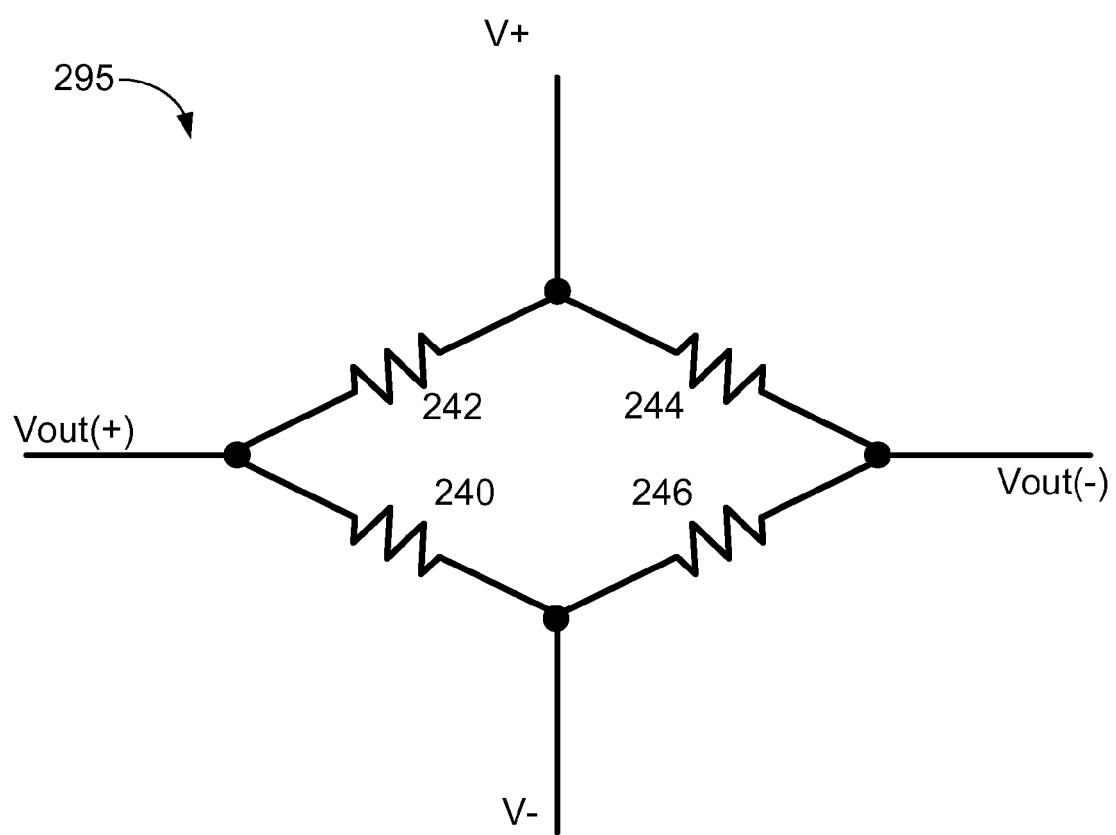
FIG. 2c depicts a schematic of a Wheatstone bridge for measuring a shear force acting on the first cross piece of the load cell, in accordance with some embodiments of the present invention.

For a shear force $F_{SX}$ to the right, on the other hand, piezoresistors 242, 246 will be under compression, while piezoresistors 240, 244 will be under tension. Wiring the piezoresistors 240, 242, 244, 246 in a second Wheatstone bridge 295, as shown in FIG. 2c, produces a signal proportional to the shear force $F_{SX}$. The two different Wheatstone bridges 290, 295, i.e., one for the axial force $F_A$ and one for force $F_{SX}$, can be achieved using two different sets of piezoresistors mounted on the cross piece. Alternatively, the two different wiring patterns 290, 295, can be switched to measure the applied forces using a single set of piezoresistors at slightly different times; switching times can be reduced to the point, however, that this delay is insignificant. Due to the gauge placement in the Wheatstone bridge, the measurement of the axial force does not effect the shear force measurement and vice-versa.

Figure 3A:
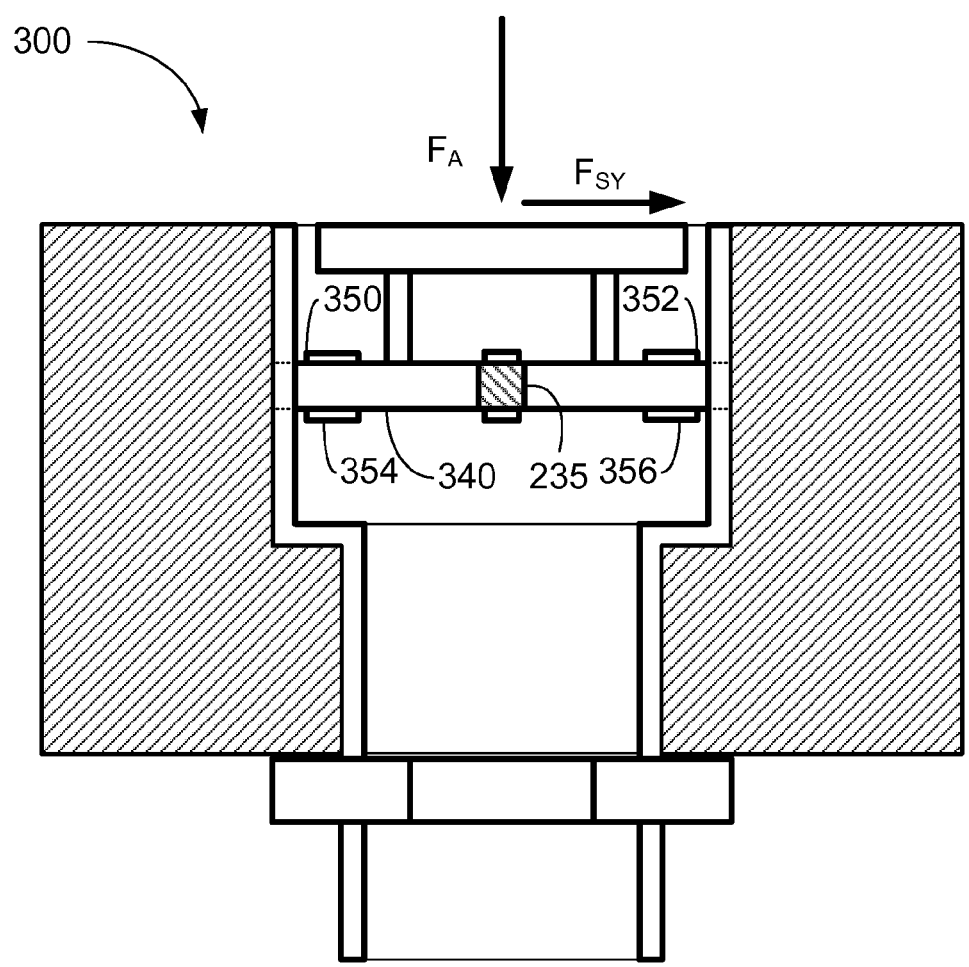
FIG. 3a depicts a cross-sectional view of a load cell with two cross pieces, in accordance with some embodiments of the present invention.
Figure 3B:
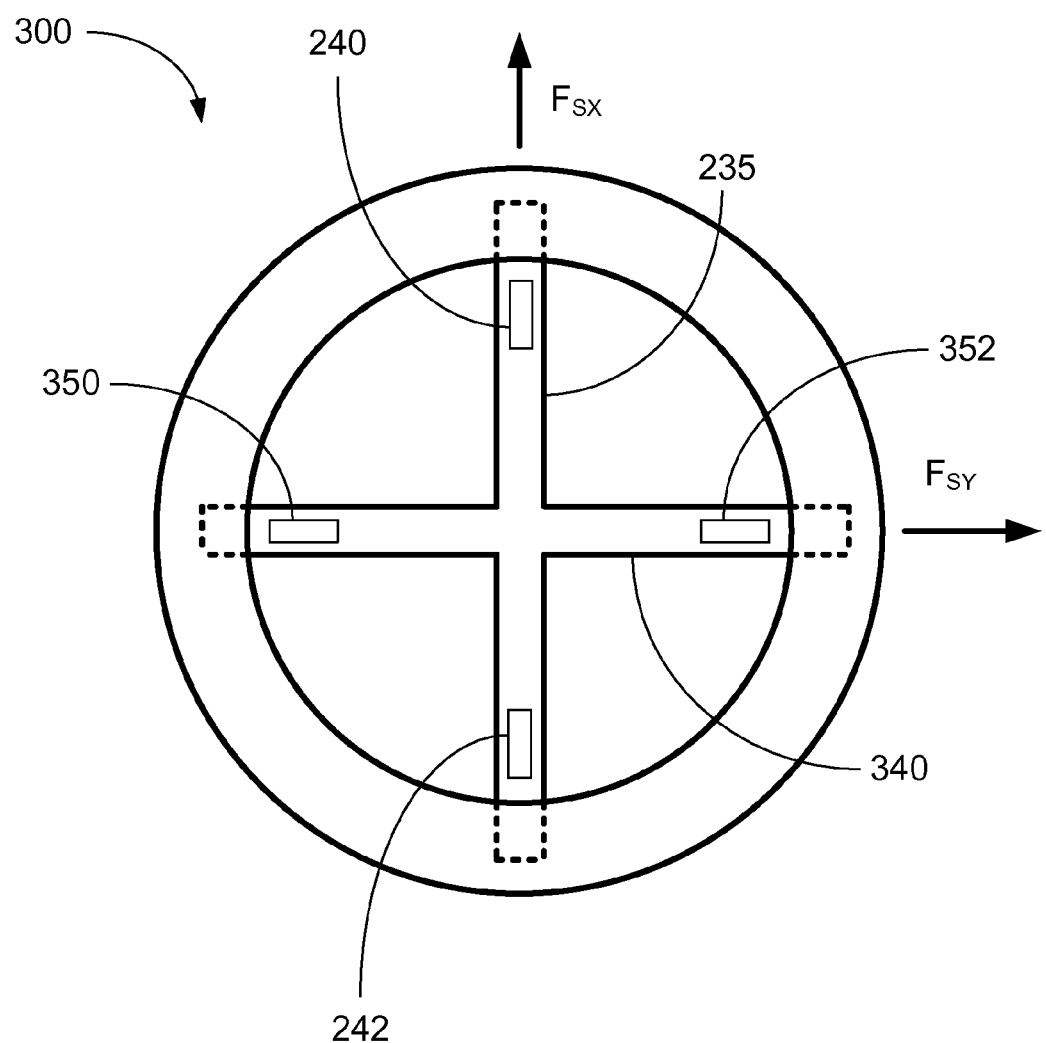
FIG. 3b depicts a top view of the load cell of FIG. 3a with two cross pieces, in accordance with some embodiments of the present invention.

As shown in FIGS. 3a and 3b, a three axis load cell 300 can enable components of the shear force that are not parallel to the first cross piece 235 to be measured with the addition of a second cross piece 340. The second cross piece 340 can be disposed at a non-parallel angle to the first cross piece 235, but in the same plane, i.e., perpendicular to the central axis of the load cell body 210. This configuration can enable a second component of the shear force to be measured. In a preferred embodiment, as shown in FIG. 3b, the second cross piece 340 can be disposed perpendicular to the first cross piece 235 such that it measures the perpendicular component $F_{SY}$ of the shear force. Disposing the first cross piece 235 perpendicular to the second cross piece 340 simplifies the derivation of the two components of the total shear force $F_S$, but is not strictly necessary. The second cross piece 340 can be fitted with a second set of one or more piezoresistors 350, 352, 354, 356 to measure the deflection thereof in response to the applied forces.

Figure 3C:
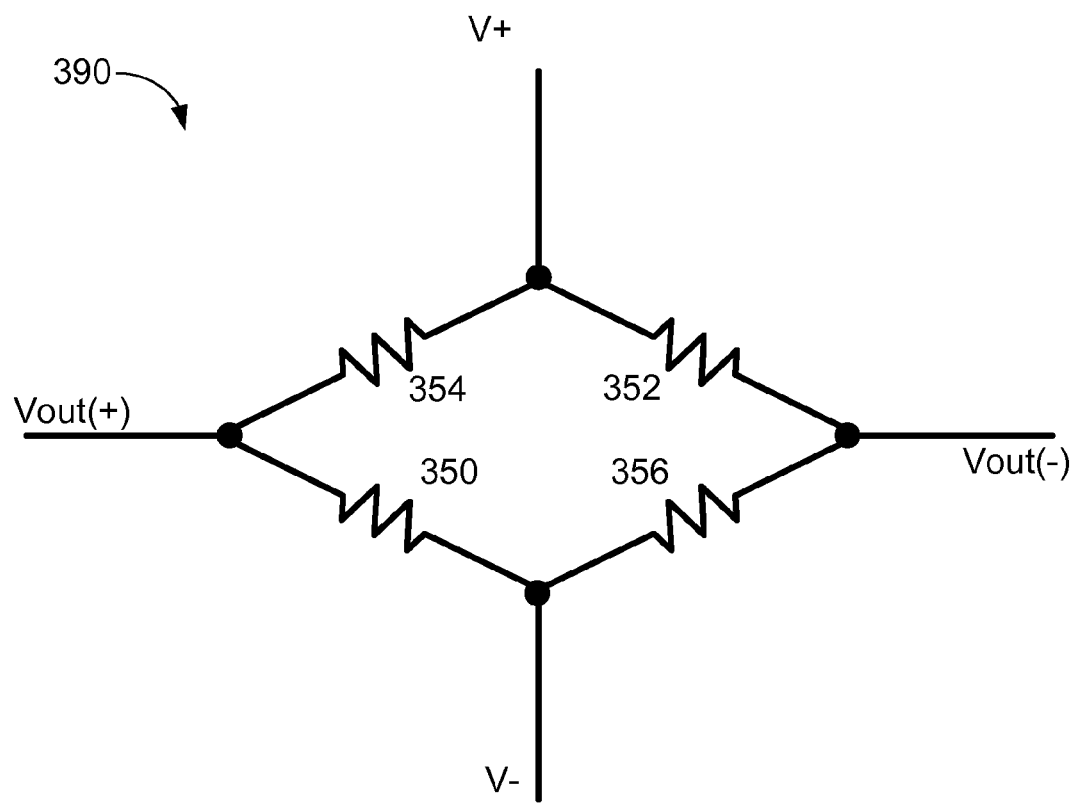
FIG. 3c depicts a schematic of a Wheatstone bridge for measuring an axial force acting on the second cross piece of the load cell, in accordance with some embodiments of the present invention.

Similar to the first cross piece 235, when the axial force $F_A$ is applied to the second cross piece 340, the second cross piece 340 deflects downward. This places piezoresistors 350, 352 in tension and piezoresistors 354, 356 in compression. Connecting the piezoresistors 350, 352, 354, 356 in a third Wheatstone bridge 390, as shown in FIG. 3c, produces a signal proportional to the axial force $F_A$ on the cross piece 340. Either this signal or the signal from the first Wheatstone bridge 290 can be used to measure the total axial force $F_A$ as the measurements are equivalent.

Figure 3D:
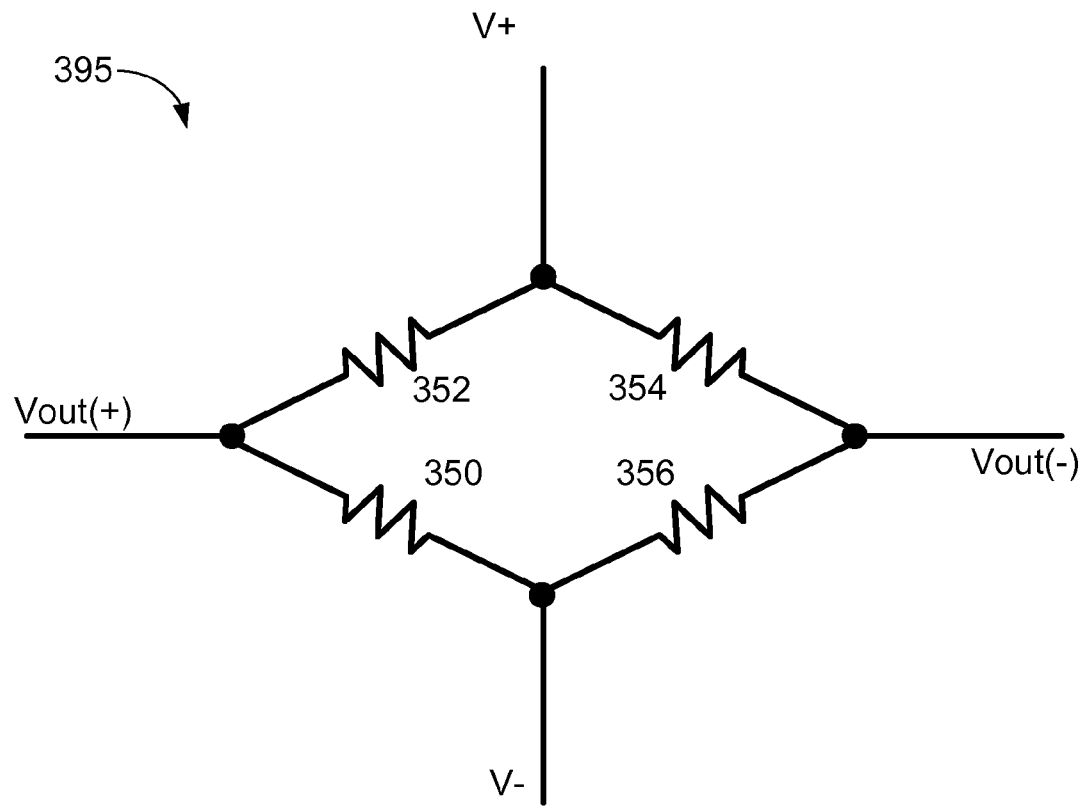
FIG. 3d depicts a schematic of a Wheatstone bridge for measuring a shear force acting on the second cross piece of the load cell, in accordance with some embodiments of the present invention.

For a shear force $F_{SY}$ to the right, piezoresistors 352, 356 will be under compression, while piezoresistors 350, 354 will be under tension. Wiring the piezoresistors 350, 352, 354, 356 in a fourth Wheatstone bridge 395, as shown in FIG. 3d, produces a signal proportional to the shear force $F_{SY}$. The two different Wheatstone bridges 390 (for $F_A$) and 395 (for $F_{SY}$) can comprise two sets of piezoresistors mounted on each end of the second cross piece 340. As before, the two different wiring patterns for FIGS. 3c and 3d can simply be switched to measure the forces at slightly different times. In addition, because there are two possible measurements for the axial force $F_A$, it is also possible to measure the shear force in one direction (i.e., $F_{SX}$ or $F_{SY}$) and the axial force $F_A$ simultaneously, and then switch to the other shear force as necessary.

In use, the signals from either the first 290 and third 390 Wheatstone bridges can be used to calculate the total axial force $F_A$ exerted by the tire on the force collector 225. The signals from the second 295 and fourth 395 Wheatstone bridges can be combined to calculate both components $F_{SX}$, $F_{SY}$ of the shear force, which can be combined to calculate the total shear force $F_S$ exerted by the tire on the force collector 225. In this manner, the axial force $F_A$ and the shear forces $F_{SX}$, $F_{SY}$ can be plotted against one another for analysis. Because of the configuration of the Wheatstone bridges, the measurement of axial force $F_A$ and the two components of shear force $F_{SX}$, $F_{SY}$ are completely isolated from one another.

Figure 4B:
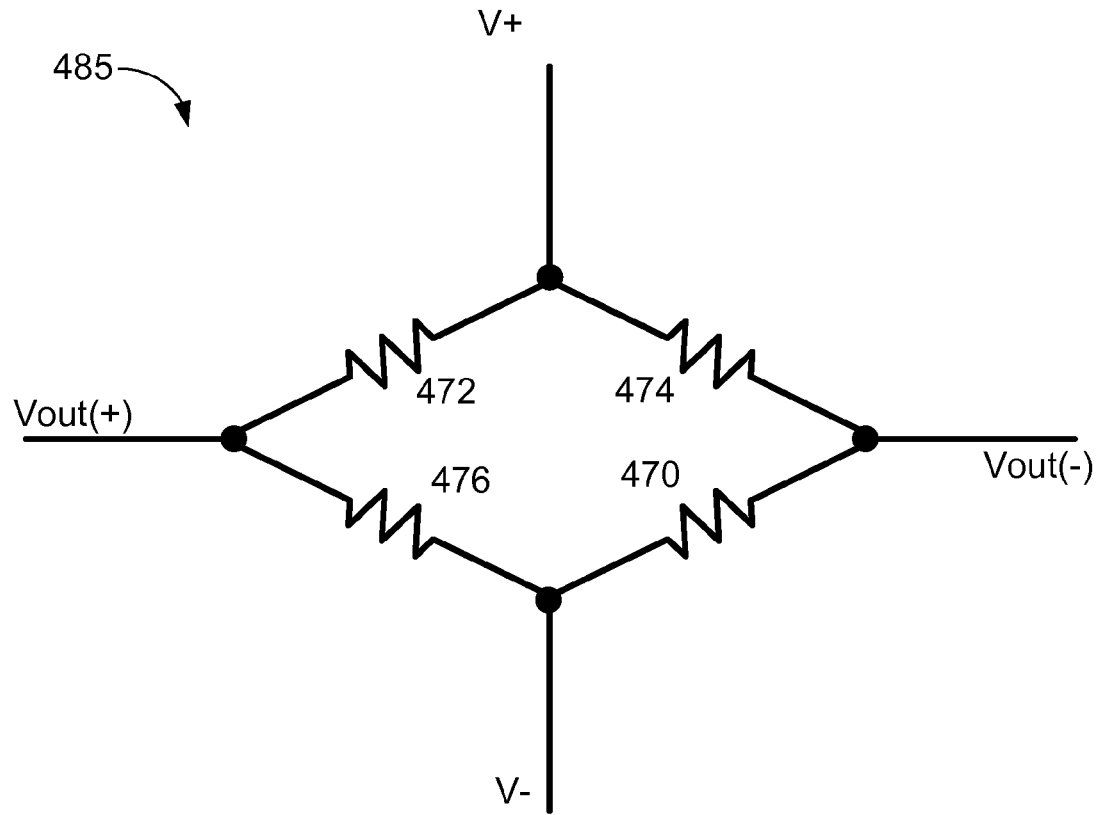
FIG. 4b depicts a schematic of a Poisson bridge for measuring an axial force acting on the connecting rods of the load cell, in accordance with some embodiments of the present invention.
Figure 5A:
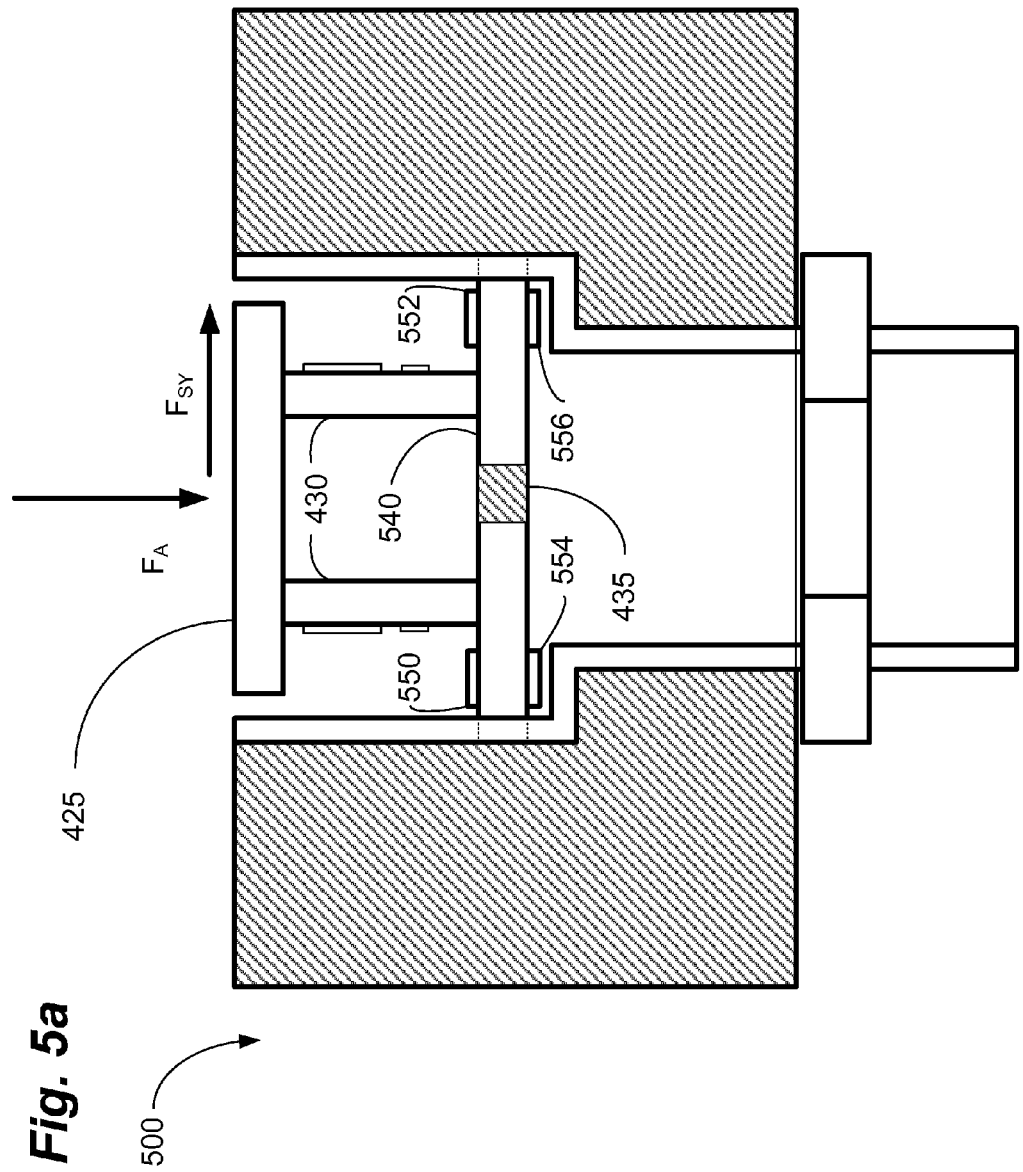
FIG. 5a depicts a cross-sectional view of a load cell with two cross pieces and extended connecting rods, in accordance with some embodiments of the present invention.

As shown in FIGS. 4a and 5a, in some embodiments the connected rods 430 can be extended. In some embodiments, the length of the connecting rods 430 can provide an area for mounting a second set of piezoresistors 470, 472, 474, 476. In this configuration, the piezoresistors 470, 472 can directly measure the compressive force $F_C$ applied to the connecting rods 430 by the force collector 425 by measuring the compression of the connecting rods 430. Piezoresistors 474, 476 can be used to measure the Poisson expansion of the beam. As shown in FIG. 4b, the signals from the piezoresistors 470, 472, 474, 476 can be combined to form a Poisson type bridge 485. The output signal of the Poisson bridge 485 is proportional to the axial force $F_A$. This configuration provides a much simpler method for measuring the axial force $F_A$.

Figure 4C:
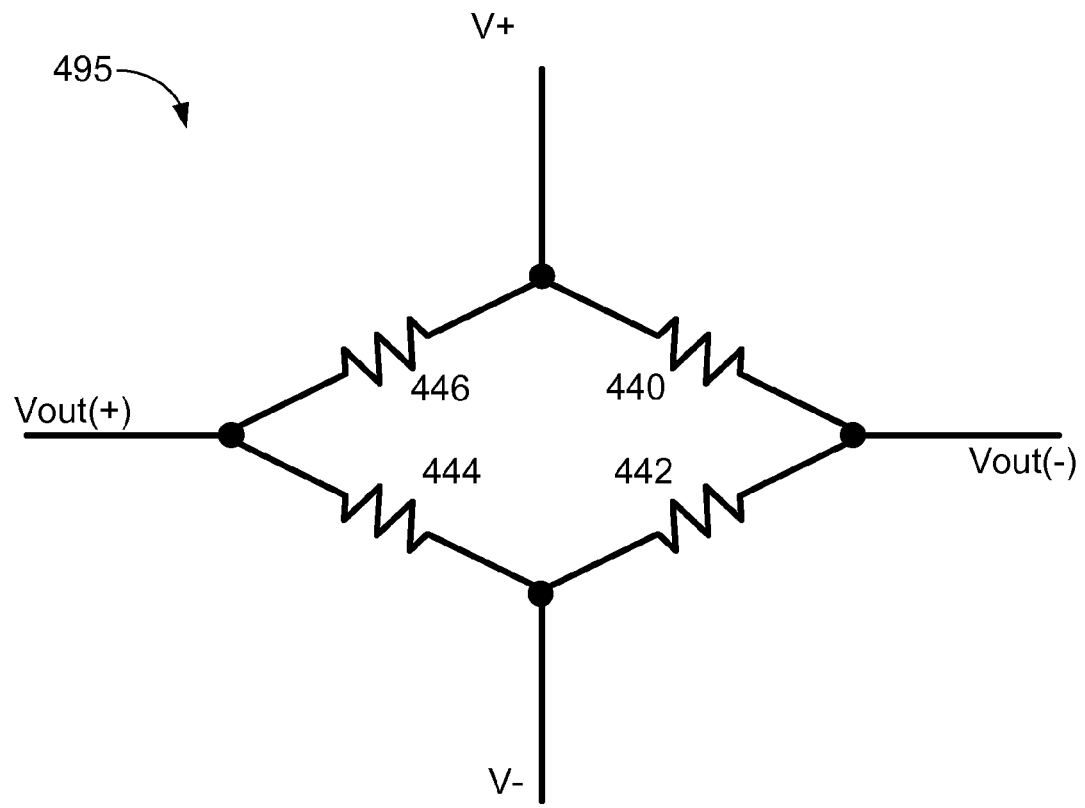
FIG. 4c depicts a schematic of a Wheatstone bridge for measuring a shear force acting on the first cross piece of the load cell, in accordance with some embodiments of the present invention.

The remaining piezoresistors 440, 442, 444, 446 can be mounted on the first cross piece 435 and can then be used to measure the shear force $F_{SX}$. For a shear force $F_{SX}$ to the right, piezoresistors 442, 446 will be under compression, while piezoresistors 440, 444 will be under tension. Wiring the piezoresistors 440, 442, 444, 446 in a Wheatstone bridge 495, as shown in FIG. 4c, produces a signal proportional to the shear force $F_{SX}$. This configuration enables the axial force $F_A$ and the shear force $F_{SX}$ to be measured simultaneously.

Figure 5B:
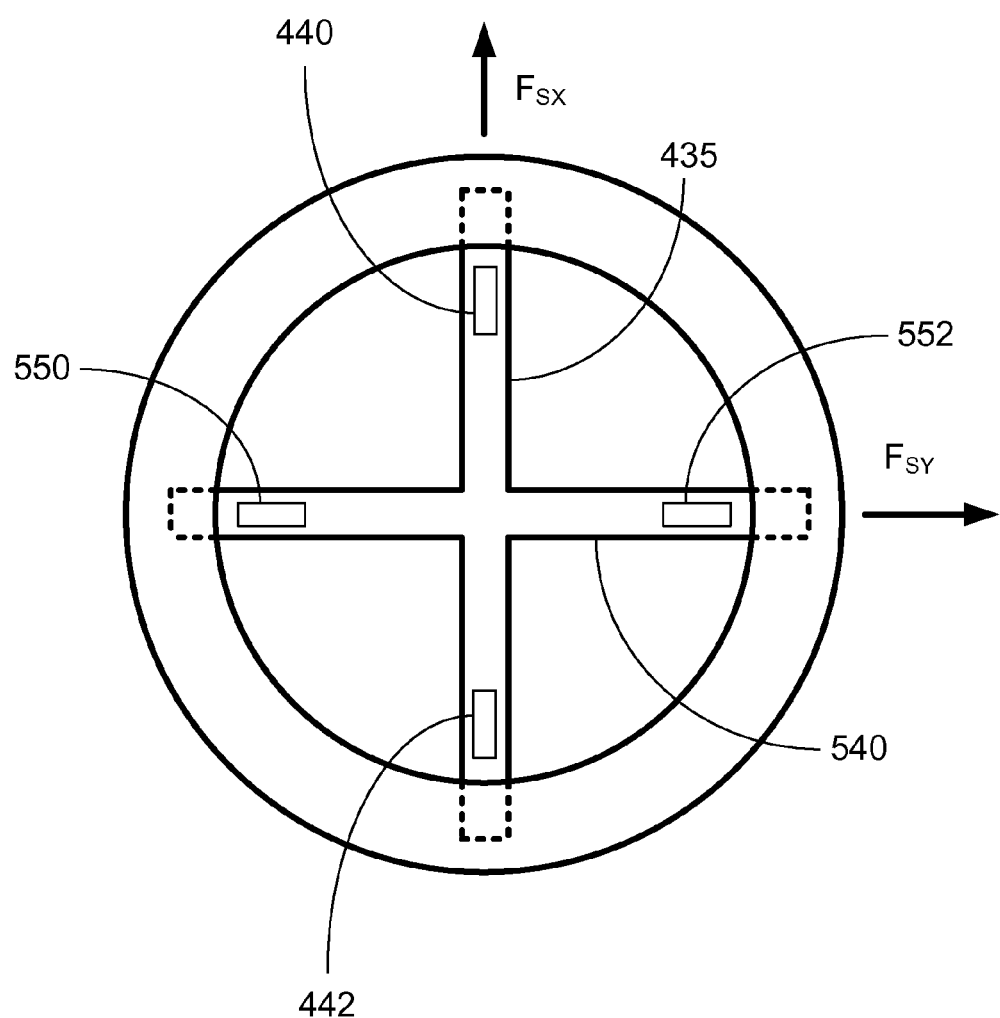
FIG. 5b depicts a top view of the load cell of FIG. 5a with two cross pieces, in accordance with some embodiments of the present invention.
Figure 5C:
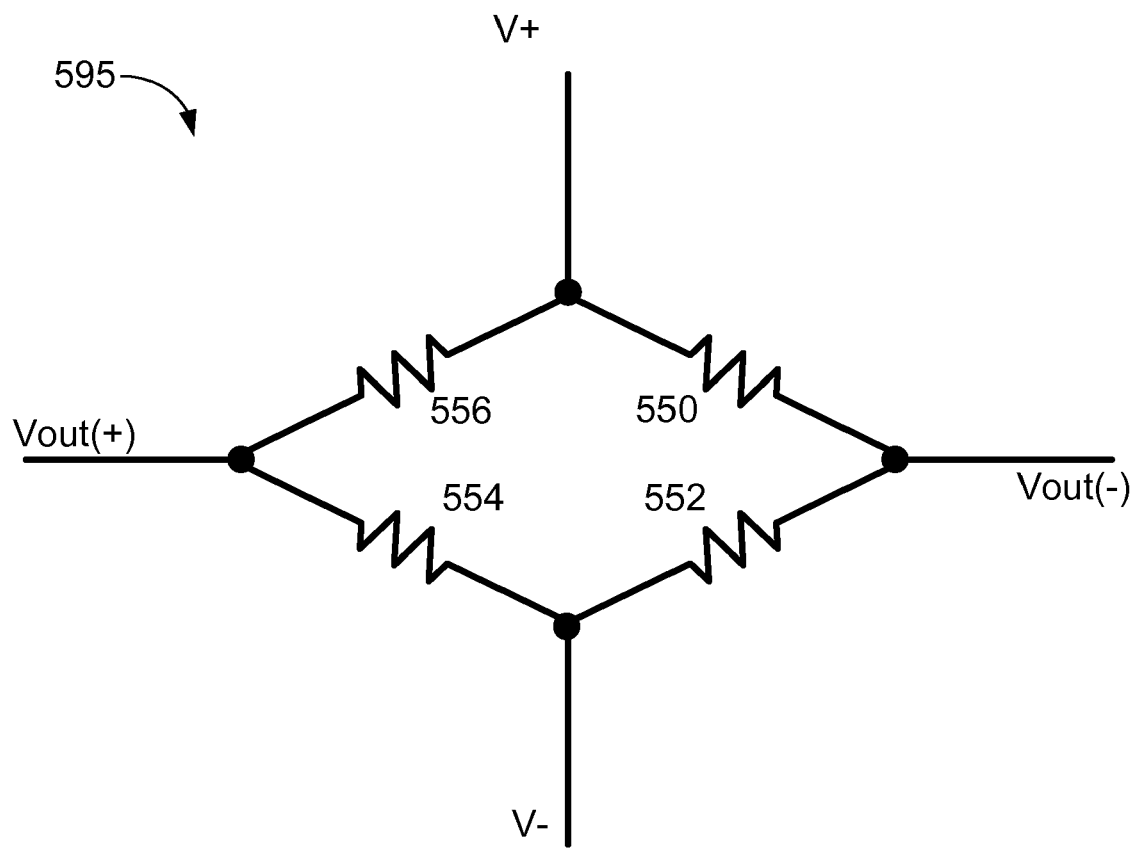
FIG. 5c depicts a schematic of a Wheatstone bridge for measuring a shear force acting on the second cross piece of the load cell, in accordance with some embodiments of the present invention.

As shown in FIGS. 5a and 5b, in some embodiments, an additional cross piece 540 can be used to measure the shear force $F_{SY}$, thus creating a second type of three axis load cell 500. For a shear force $F_{SY}$ to the right, piezoresistors 552, 556 will be under compression, while piezoresistors 550, 554 will be under tension. Wiring the piezoresistors 550, 552, 554, 556 in a Wheatstone bridge 595, as shown in FIG. 5c, produces a signal proportional to the shear force $F_{SY}$. The Poisson bridge 485 coupled with the two Wheatstone bridges 495, 595 enables the axial force $F_A$ and both shear forces $F_{SX}$, $F_{SY}$, respectively, to be measured simultaneously.

In the dynamometer example of FIG. 1, for example, multiple load cells 200, 300, 400, 500 can be installed in the surface of the roller 110 to produce a force profile across the roller 110. This force profile can include the rotational force applied to the tire, the axial force $F_A$, or both. The tire 105 can be accelerated on the drum increasing the total shear force $F_S$ that must be generated by the tire 105 on the drum 110 to prevent slippage. As the tire 105 breaks loose and begins to spin on the roller 110, the force profile measured by the load cells 200, 300, 400, 500 will drop off indicting a loss of traction. This can enable testing at a constant axial force $F_A$ with increasing rotational force; or, a constant rotational force with decreasing axial force $F_A$, for example, to evaluate various tire constructions and/or compounds. The tire 105 can also be turned in relation to the drum 110 (i.e., simulating a car turning while driving) to determine the shear forces required to initiate this turn. The ability to measure both components of the shear force $F_{SX}$, $F_{SY}$ enables precise analysis of the turn.

Embodiments of the present invention have been described with reference to tire testing for the sake of clarity and simplicity; however, the invention is not so limited. Embodiments of the present invention can be used whenever it is desirable to measure force along two or three axes. For example, as shown in FIG. 6, embodiments of the present invention can be used for the testing and development of bearings.

Figure 6:
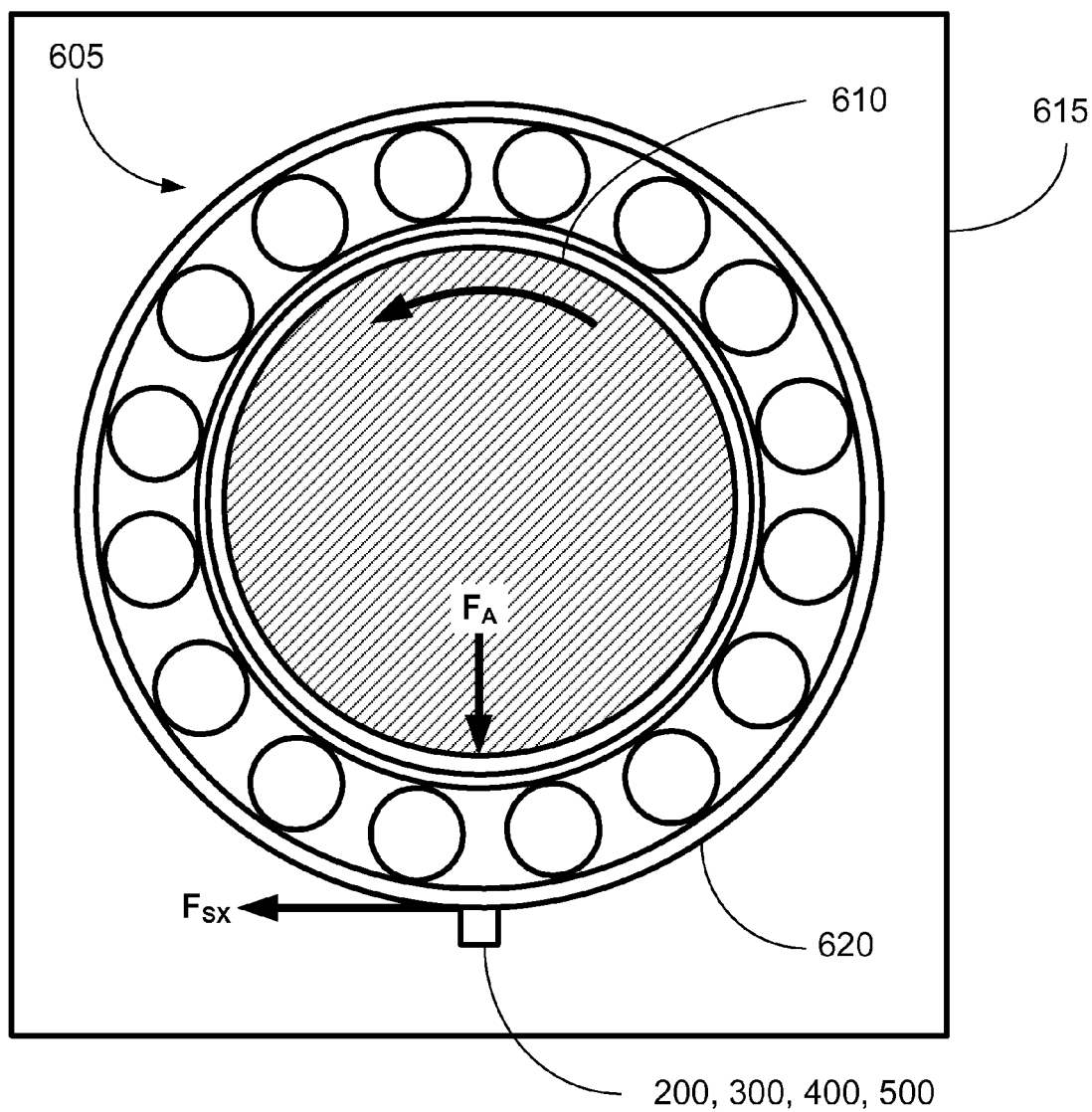
FIG. 6 depicts a load cell installed in a bearing retainer, in accordance with some embodiments of the present invention.

As shown in FIG. 6, one or more load cells 200, 300, 400, 500 can be installed in a bearing block or bearing retainer 615. The bearing retainer 615 can house a bearing 605, which can be, for example and not limitation, a roller bearing (shown), a plain bearing, or a needle bearing. The bearing 605 can support a rotating shaft 610, such as a driveshaft or a motor shaft. As the axial force $F_A$ applied to the shaft 610 increases, the friction in the bearing 605 also increases. This creates a shear force $F_S$ opposite the direction of rotation of the bearing retainer 615.

Installing one or more load cells 200, 300, 400, 500 in the bearing retainer 615 adjacent the outer race 620 of the bearing 605 can enable both the shear force $F_S$ and the axial force $F_A$ to be measured. The use of a two-axis load cell 200, 400 can enable the measurement of the shear force $F_{SX}$ perpendicular to the shaft and the axial force $F_A$. The use of a three-axis load cell 300, 500 can enable the measurement of the shear force $F_{SX}$, the axial force $F_A$, and the shear force along the shaft $F_{SY}$ (not shown). The longitudinal shear force $F_{SY}$ can be caused, for example and not limitation, by bearing preload, improper installation, or shaft endplay.

Unlike the tire example, above, bearing design is centered on reducing friction, i.e., minimizing shear forces $F_S$, and increasing load capacity, i.e. maximizing axial force $F_A$ capacity. The development of new bearing 605 designs with lower friction and higher load capacity increases machine efficiency and reduces maintenance.

Load cells 200, 300, 400, 500 can also be installed on existing machines to detect potential bearing 605 failures before they become catastrophic. In other words, if the axial force on a bearing 605 remains constant, but the shear forces begin to climb; this can indicate a failure of the bearing 605 or the lubrication system for the bearing 605. Detection by one or more load cells 200, 300 can enable the problem to be remedied or the bearing to be replaced before a catastrophic failure occurs. This can improve productivity and reduce maintenance costs.

While several possible embodiments are disclosed above, embodiments of the present invention are not so limited. For instance, while embodiments of the present invention have been disclosed with respect to load cells installed on both tire and bearing equipment, other uses are contemplated. In addition, the location and configuration used for various features of embodiments of the present invention can be varied according to a particular application or surface that requires a slight variation due to, for example, the materials used and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A load cell comprising:
a first cross piece positioned along a first plane and fixed at first and second ends;
a force collector positioned along a second plane, the second plane being substantially parallel to the first plane;
one or more connecting rods coupling the first cross piece to the force collector; and
a first set of one or more piezoresistors disposed on the first cross piece;
wherein a force applied to the force collector is imputed through the connecting rods to the first cross piece; and
wherein the first set of one or more piezoresistors measure the deflection of the first cross piece due to an axial force and a shear force.

2. The load cell of claim 1, further comprising:
a load cell body with a top and a bottom;
wherein the first cross piece is disposed between the top and the bottom of the load cell body; and
wherein the force collector is disposed even with, or slightly above, the top of the load cell body.

3. The load cell of claim 1, further comprising:
a switch with a first position and a second position;
wherein, in the first position, the first set of one or more piezoresistors is connected to form a first Wheatstone bridge that outputs a first signal proportional to the axial force; and
wherein, in the second position, the first set of one or more piezoresistors is connected to form a second Wheatstone bridge that outputs a second signal proportional to the shear force on the first cross piece.

4. The load cell of claim 1, further comprising:
a second set of one or more piezoresistors disposed on the one or more connecting rods;
wherein the first set of one or more piezoresistors is connected to form a second Wheatstone bridge that outputs a first signal proportional to the shear force on the first cross piece; and
wherein the second set of one or more piezoresistors is connected to form a first Poisson bridge that outputs a second signal proportional to the compressive force on the one or more connecting rods.

5. A load cell comprising:
a first cross piece fixed at first and second ends;
a second cross piece fixed at first and second ends;
a force collector disposed above the first and second cross pieces;
one or more connecting rods coupling the first and second cross pieces to the force collector;
a first set of one or more piezoresistors disposed on the first cross piece; and
a second set of one or more piezoresistors disposed on the second cross piece;
wherein a force applied to the force collector is transmitted through the connecting rods to the first and second cross pieces; and
wherein the first and second sets of one or more piezoresistors measure the deflection of the first and second cross pieces due to an axial force and a shear force.

6. The load cell of claim 5, further comprising:
a load cell body with a top and a bottom;
wherein the first and second cross pieces are disposed between the top and the bottom of the load cell body; and
wherein the force collector is disposed even with, or slightly above, the top of the load cell body.

7. The load cell of claim 5, further comprising:
a switch with a first position and a second position;
wherein, in the first position:
the first set of one or more piezoresistors is connected to form a first Wheatstone bridge that outputs a first signal proportional to the axial force; and the second set of one or more piezoresistors is connected to form a fourth Wheatstone bridge that outputs a second signal proportional to the shear force on the second cross piece; and wherein, in the second position:
the first set of one or more piezoresistors is connected to form a second Wheatstone bridge that outputs a third signal proportional to the shear force on the first cross piece; and
the second set of one or more piezoresistors is connected to form a third Wheatstone bridge that outputs a fourth signal proportional to the axial force.

8. The load cell of claim 7, wherein the second signal and the third signal are combined to output a fifth signal proportional to the total shear force on the force collector.

9. The load cell of claim 5, further comprising:
a third set of one or more piezoresistors disposed on the one or more connecting rods;
wherein the first set of one or more piezoresistors is connected to form a second Wheatstone bridge that outputs a first signal proportional to the shear force on the first cross piece;
wherein the second set of one or more piezoresistors is connected to form a fourth Wheatstone bridge that outputs a second signal proportional to the shear force on the second cross piece; and
wherein the third set of one or more piezoresistors is connected to form a first Poisson bridge that outputs a signal proportional to the axial force.

10. A load cell comprising:
a load cell body;
a first cross piece, with a first end and a second end, disposed inside the load cell body, below the top of the load cell body, and perpendicular to the central axis of the load cell body and affixed to the load cell body at the first end and the second end;
a force collector disposed even with or slightly above the top of the load cell body; and
one or more connecting rods, each with a first end and a second end, each first end coupled to the first cross piece and each second end coupled to the force collector;
wherein a force applied to the force collector is transmitted through the connecting rods to the first cross piece;
wherein the force collector, the first cross piece, and the one or more connecting rods are manufactured from a single piece of material.

11. The load cell of claim 10, further comprising:
one or more piezoresistors disposed on the first cross piece to measure the deflection of the first cross piece; and
a switch with a first position and a second position;
wherein, in the first position, the one or more piezoresistors are connected to form a first Wheatstone bridge that outputs a first signal proportional to the axial force; and
wherein, in the second position, the one or more piezoresistors are connected to form a second Wheatstone bridge that outputs a second signal proportional to the shear force on the first cross piece.

12. The load cell of claim 10, further comprising:
a first set of one or more piezoresistors disposed on the first cross piece to measure the deflection of the first cross piece; and
a second set of one or more piezoresistors disposed on the first cross piece to measure the deflection of the first cross piece;
wherein the first set of piezoresistors is connected to form a first Wheatstone bridge that outputs a first signal proportional to the axial force; and
wherein the second set of piezoresistors is connected to form a second Wheatstone bridge that outputs a second signal proportional to the shear force on the first cross piece.

13. The load cell of claim 10, further comprising:
a first set of one or more piezoresistors disposed on the first cross piece to measure the deflection of the first cross piece; and
a second set of one or more piezoresistors disposed on the one or more connecting rods to measure the deflection of the one or more connecting rods;
wherein the first set of one or more piezoresistors is connected to form a second Wheatstone bridge that outputs a first signal proportional to the shear force on the first cross piece; and
wherein the second set of one or more piezoresistors is connected to form a first Poisson bridge that outputs a second signal proportional to the axial force.

14. A load cell comprising:
a load cell body;
a first cross piece, with a first end and a second end, disposed inside the load cell body, below the top of the load cell body, and perpendicular to the central axis of the load cell body and affixed to the load cell body at the first end and the second end;
a second cross piece, with a first end and a second end, disposed inside the load cell body at a non-zero angle to the first cross piece, below the top of the load cell body, perpendicular to the central axis of the load cell body, and affixed to the load cell body at the first end and the second end;
a force collector disposed even with or slightly above the top of the load cell body; and
one or more connecting rods, each with a first end and a second end, each first end coupled to one of the first cross piece and the second cross piece, and each second end coupled to the force collector;
wherein a force applied to the force collector is transmitted through the connecting rods
to the first cross piece or the second cross piece.

15. The load cell of claim 14, further comprising:
a first set of one or more piezoresistors disposed on the first cross piece to measure the deflection of the first cross piece;
a second set of one or more piezoresistors disposed on the second cross piece to measure the deflection of the second cross piece; and
a switch with a first position and a second position;
wherein, in the first position:
the first set of one or more piezoresistors are connected to form a first Wheatstone bridge, that outputs a first signal proportional to the axial force; and
the second set of one or more piezoresistors are connected to form a fourth Wheatstone bridge, that outputs a second signal proportional to the shear force on the second cross piece; and
wherein, in the second position:
the first set of one or more piezoresistors are connected to form a second Wheatstone bridge, that outputs a third signal proportional to the shear force on the first cross piece; and
the second set of one or more piezoresistors are connected to form a third Wheatstone bridge, that outputs a fourth signal proportional to the axial force.

16. The load cell of claim 15, wherein
the second and third signals can be combined to output a fifth signal proportional to the total shear force on the force collector.

17. The load cell of claim 14, further comprising:
a first set of one or more piezoresistors disposed on the first cross piece to measure the deflection of the first cross piece; and
a second set of one or more piezoresistors disposed on the first cross piece to measure the deflection of the first cross piece;
a third set of one or more piezoresistors disposed on the second cross piece to measure the deflection of the second cross piece; and
a fourth set of one or more piezoresistors disposed on the second cross piece to measure the deflection of the second cross piece;
wherein the first set of piezoresistors is connected to form a first Wheatstone bridge that outputs a first signal proportional to the axial force; and
wherein the second set of piezoresistors is connected to form a second Wheatstone bridge that outputs a second signal proportional to the shear force on the first cross piece;
wherein the third set of piezoresistors is connected to form a third Wheatstone bridge that outputs a third signal proportional to the axial force; and
wherein the fourth set of piezoresistors is connected to form a fourth Wheatstone bridge that outputs a fourth signal proportional to the shear force on the second cross piece.

18. The load cell of claim 17, wherein the second and fourth signals can be combined to output a sixth signal proportional to the total shear force on the force collector.

19. The load cell of claim 14, further comprising:
a first set of one or more piezoresistors disposed on the first cross piece to measure the deflection of the first cross piece;
a second set of one or more piezoresistors disposed on the second cross piece to measure the deflection of the second cross piece; and
a third set of one or more piezoresistors disposed on the one or more connecting rods to measure the deflection of the one or more connecting rods;
wherein the first set of one or more piezoresistors is connected to form a second Wheatstone bridge that outputs a first signal proportional to the shear force on the first cross piece;
wherein the second set of one or more piezoresistors is connected to form a fourth Wheatstone bridge that outputs a second signal proportional to the shear force on the second cross piece; and
wherein the third set of one or more piezoresistors is connected to form a first Poisson bridge that outputs a third signal proportional to the axial force on the force collector.

20. The method of claim 19, wherein the first signal and the second signal can be combined to output a fourth signal proportional to the total shear force on the force collector.

21. The load cell of claim 14, wherein the force collector, first cross piece, the second cross piece, and one or more connecting rods are manufactured from a single piece of material.

22. The load cell of claim 14, wherein
the load cell is mounted in a surface such that the load cell body is substantially even with the surface; and
wherein the force collector has substantially the same coefficient of friction as the surface.

* * * * *